United States Patent
Chellappa

(10) Patent No.: US 10,280,474 B2
(45) Date of Patent: May 7, 2019

(54) DISPERSING AGENT COMPOSITION FOR TANNING OF HIDES/SKINS AND PROCESS FOR THE PREPARATION THEREOF

(71) Applicant: COUNCIL OF SCIENTIFIC & INDUSTRIAL RESEARCH, New Delhi (IN)

(72) Inventor: Muralidharan Chellappa, Chennai (IN)

(73) Assignee: Council of Scientific & Industrial Research, New Delhi (IN)

( * ) Notice: Subject to any disclaimer, the term of this patent is extended or adjusted under 35 U.S.C. 154(b) by 16 days.

(21) Appl. No.: 15/539,953

(22) PCT Filed: Jul. 11, 2016

(86) PCT No.: PCT/IN2016/050232
§ 371 (c)(1),
(2) Date: Jun. 26, 2017

(87) PCT Pub. No.: WO2017/009867
PCT Pub. Date: Jan. 19, 2017

(65) Prior Publication Data
US 2017/0342512 A1  Nov. 30, 2017

(30) Foreign Application Priority Data
Jul. 13, 2015  (IN) .......................... 2104/DEL/2015

(51) Int. Cl.
| | | |
|---|---|---|
| C14C 3/02 | (2006.01) | |
| C14C 3/08 | (2006.01) | |
| C14C 3/06 | (2006.01) | |
| C14C 3/10 | (2006.01) | |
| B01F 17/00 | (2006.01) | |

(52) U.S. Cl.
CPC ............ *C14C 3/08* (2013.01); *B01F 17/0085* (2013.01); *C14C 3/02* (2013.01); *C14C 3/06* (2013.01); *C14C 3/10* (2013.01)

(58) Field of Classification Search
CPC .... C14C 3/02; C14C 3/08; C14C 3/06; C14C 3/10
See application file for complete search history.

(56) References Cited

U.S. PATENT DOCUMENTS 2,523,326 A  9/1950  Putnam .......................... 8/94.33

FOREIGN PATENT DOCUMENTS

| CN | 103255000 | 8/2013 | |
| WO | WO 2009/105962 | 9/2009 | |
| WO | WO 2009/105962 A1 * | 9/2009 | ............... C14C 3/08 |

OTHER PUBLICATIONS

International Search Report and Written Opinion issued in PCT/IN2016/050232, dated Oct. 28, 2016.

* cited by examiner

*Primary Examiner* — Eisa B Elhilo
(74) *Attorney, Agent, or Firm* — Norton Rose Fulbright US LLP

(57) ABSTRACT

Disclosed herein is a dispersing agent composition essentially comprising polyalkylene polyhydric compound, an organic acid and a non-ionic surfactant. The dispersing composition finds application in leather processing industry for tanning without adding any water or any other medium. It finds tremendous application potential in the tanning industry to ensure eco-benign leather processing that does not add to environmental pollution as no effluent is generated. The invention is therefore envisaged to play a crucial role in enhancing the economic and environmental benefits associated with tanning industry. The disclosure also relates to a process for preparing the composition and also the process of eco-benign tanning using the said composition.

7 Claims, No Drawings

12# DISPERSING AGENT COMPOSITION FOR TANNING OF HIDES/SKINS AND PROCESS FOR THE PREPARATION THEREOF

CROSS-REFERENCE TO RELATED APPLICATIONS

This application is a national phase application under 35 U.S.C. § 371 of International Application No. PCT/IN2016/050232 filed 11 Jul. 2016, which claims priority to Indian Patent Application No. 2104/DEL/2015 filed 13 Jul. 2015. The entire contents of each of the above-referenced disclosures is specifically incorporated herein by reference without disclaimer.

FIELD OF INVENTION

The present invention relates to a dispersing agent composition for tanning of hide/skin without adding any water or any other medium. The invention further relates to a process for tanning using the said dispersing agent, whereby the tanning is carried out as a waterless-process, without adding any medium. The present invention is envisaged to have tremendous application potential in the tanning industry to ensure eco-benign leather processing that does not add to environmental pollution as no effluent would be generated. The invention is therefore envisaged to play a crucial role in enhancing the economic and environmental benefits associated with tanning.

BACKGROUND OF THE INVENTION

Leather making implicates use of large quantities of water, for conversion of raw hides and skins into finished leather. Typically in leather processing the preserved hides and skins are treated with water initially to rehydrate the skins. Subsequently they are treated with lime and sulfide or enzyme to facilitate removal of the hair and flesh adhering to the skins. The material at this stage is called limed pelt. These pelts are then processed in wooden drums using water as the medium of processing. The pelts are treated with acid salts to remove residual lime and short hairs present in an operation called deliming and bating. The operation employs about 2-3 L of water per kilo of pelt. The medium is then discharged as effluent. Sometimes, degreasing for removal of excess fat is also carried out along with deliming and bating. Subsequently the pelts are treated with 1-2 L of water per kilo of pelt along with salt and acid to condition to a pH of 2.5-2.8 from the pelt pH of about 8.0. This operation is called pickling. The used medium is again discharged as effluent rich in salinity. The pickled pelts are then treated with about 2-3 L of water per kilo of material along with 8% chromium based tanning agent and mixture of alkalis in a process called chrome tanning. The material obtained at the end of chrome tanning is called "Wet blue leather". The pH of the leather will be in the range of 3.8-4.0.

The pelts are sometimes treated with vegetable tannins instead of chromium. The leathers obtained through such process are called vegetable tanned leathers.

Essentially all these operations employ water as medium in drums to produce leathers of defined quality. Globally, this remains practice of leather making and for conversion of one kilo of pelt to tanned leathers nearly 5-6 L of water is employed which includes intermittent washing of leathers between the various operations.

While on one side need for water poses serious availability problem and since most of the water is discharged as effluent, treatment of the large quantity of effluent with all residual chemicals is another major environmental challenge. Nearly 30,000 Tonnes of hides and skins are processed per day globally leading to use of about 150-200 million liters of water on daily basis. The same quantity of water with high salinity, chromium residues and other unutilized chemicals need to be treated as effluent every day. Such practices have threatened the sustainability of leather making.

Efforts are being made to avoid use of water in leather processing. Our co-pending patent (0085/DEL/2014) deals with a tanning composition for water free pickle free tanning. This requires Basic Chromium Sulphate (BCS) as an ingredient for tanning composition preparation, limiting the scope for wide manufacturing and application. Further it is applicable only for chrome tanning and not for vegetable tanning.

Thus, keeping in view the drawbacks of the hitherto reported prior art the inventors of the present invention realized that there exists a dire need to provide a composition that obviates the above limitations and ensures that the tanning process is executed without using water or any other medium as done in conventional processes.

OBJECTIVES OF THE INVENTION

The main objective of the present invention is thus to provide a dispersing agent composition for tanning of hide/skin without adding any water or any other medium, which obviates the limitations as stated above.

Another objective of the present invention is to avoid water which is used as medium for leather processing and carry out the process without any addition of water being aided only by the inherent moisture in the substrate thereby not generating any effluent.

SUMMARY OF THE INVENTION

The present invention provides a dispersing agent composition for tanning of hides/skins without adding any water or any other medium, wherein the said composition comprises:
(a) 60-80 wt % of a polyalkylene polyhydric compound having carbon chain length in the range of C3 to C15 with high solubility in water, with transparent to translucent appearance;
(b) 5-25 wt % of an organic acid; and
(c) 5-15 wt % of a non-ionic surfactant.

In an embodiment of the present invention, the said composition exhibits pH in the range of 1-4 and stability against acid and alkali.

In another embodiment of the present invention, the polyalkylene polyhydric compound used may be selected from Sorbitol, Mannitol, Glycerol or their polymeric versions.

In still another embodiment of the present invention, the organic acid compound may be selected from Ethanoic acid, Propionic acid hydroxyl propionic acid.

In yet another embodiment of the present invention, the non-ionic surfactant used may be selected from Poly ethylene glycol, poly propylene glycol.

Further the present invention provides a process for the preparation of dispersing agent composition for tanning of hide/skin without adding any water or any other medium, which comprises:
(a) mixing 60-80 wt % of a polyalkylene polyhydric compound having carbon chain length in the range of C3 to C15 with high solubility in water, with transparent to translucent appearance;

(b) Adding 5-25 wt % of an organic acid; and (c) Adding 5-15 wt % of a non-ionic surfactant.

for a period of 30 minutes to 2 hours to obtain the desired dispersing agent.

Further, the present invention provides a tanning process characterized in that it uses the dispersing agent composition as described above, wherein the steps comprise treating the delimed pelt with a mixture of the prepared dispersing agent composition and tanning agent mixed in the ratio of 1:5 to 3:4 for a period of 3 to 10 hours to obtain tanned hide/skin.

DETAILED DESCRIPTION OF THE INVENTION

The present invention provides a dispersing agent composition and a process for the preparation thereof. The said composition is useful in water less tanning of hides/skins.

The dispersing agent is prepared by mixing 60-80% of polyalkylene polyhydric compound of carbon chain length in the range of $C_3$ to $C_{15}$ with high solubility in water, with transparent to translucent appearance, 1-15% of an organic acid and 5-15% non-ionic surfactant by stiffing together for a period of 30 minutes to 2 hours to produce dispersing agent with the following characteristics:

pH: 1-4

Stability against acid and alkali: Very Good

The composition is used for tanning in the following manner:

The delimed pelts are treated with a mixture of the prepared dispersing agent and tanning agent mixed in the ratio of 1:5 to 3:4 for a period of 3 to 10 hrs.

In an important aspect of the present invention the ingredients are chosen in such a manner that in appropriate quantities standardized after extensive experimentation so that the resulting dispersing agent is able to completely replace the use of water for leather processing while not altering the properties of the leathers obtained via water free processing and ensuring compatibility with auxiliaries and chemicals used in leather processing.

EXAMPLES

The following examples are given by way of illustration only and therefore should not be construed to limit the scope of the present invention in any manner

Example 1

Dispersing agent was prepared by mixing 200 gms of sorbitol, 75 gms parts of ethanoic acid and 25 gms of Poly ethylene glycol for 30 minutes to produce 300 grams of dispersing agent.

The product had the following characteristics.

pH: 2.5

Stability against acid and alkali: Very Good

Solubility: High

Ten Goat delimed pelts weighing 10 kg were treated with above dispersing agent and 400 gms of Basic Chromium sulfate and 100 gms of sodium formate for 3 hrs to obtain wet blue leather.

Example 2

Dispersing agent was prepared by combining 800 gms of glycerol, 50 grams of hydroxyl propionic acid, 150 gms of Poly ethylene glycol and mixing for 120 minutes to produce 1000 grams of dispersing agent.

The dispersing agent had the following characteristics.

pH: 4

Stability against acid and alkali: Very Good

Solubility: Very High

Five cow delimed pelts weighing 50 kg were treated with above dispersing agent and 2000 gms of Basic Chromium sulfate and 1000 gms of sodium formate for 10 hrs to obtain wet blue leather.

Example 3

Dispersing agent was prepared by combining 240 gms parts of sorbitol, 75 gms of propionic acid, 25 parts of Poly propylene glycol and mixing for 30 minutes to produce 340 grams of dispersing agent.

The dispersing agent had the following characteristics.

pH: 3

Stability against acid and alkali: Very Good

Solubility: High

Ten delimed sheep pelts weighing 10 kg were treated with the above dispersing agent and 1500 grams of Wattle extract for 5 hrs to get vegetable tanned leathers.

TABLE 1

Tanning Efficiency obtained using the prepared compositions

| Sl. No. | Composition | Results obtained (% Efficiency)* |
|---|---|---|
| 1 | A alone | 50 |
| 2 | B alone | 10 |
| 3 | C alone | 25 |
| 4 | A:B::10:1 | 50 |
| 5 | A:C::10:1 | 55 |
| 6 | B:C::2:1 | 35 |
| 7 | A:B:C::12:1:1 | 80 |
| 8 | A:B:C::16:5:3 | 100 |
| 9 | A:B:C::18:1:1 | >95 |
| 10 | A:B:C::25:1:0.5 | 80 |
| 11 | A:B:C::10:5:3 | 75 |
| 12 | A:B:C::15:1:1 | 85 |

A = polyalkylene polyhydric compound, B = organic acid and C = non-ionic surfactant.
(*As assessed by penetration of tanning agent in the cross section of hide/skin visually)

Advantages of the Invention

The prepared dispersing agent is a versatile product.

Using the dispersing agent eliminates the need for water and common salt in tanning and consequently effluents from the tanning step.

I claim:

1. A dispersing agent composition for tanning of hides/skins without adding water or any other medium, wherein said composition comprises:

(a) 60-80 wt % of a polyalkylene polyhydric compound having carbon chain length in the range of C3 to C15 with high solubility in water, with transparent to translucent appearance;

(b) 5-25 wt % of an organic acid and (c) 5-15 wt % of a non-ionic surfactant.

2. The composition as claimed in claim 1, wherein said composition exhibits pH in the range of 1-4.

3. The composition as claimed in claim 1, wherein the polyalkylene polyhydric compound is selected from the group consisting of sorbitol, mannitol, glycerol or their polymeric derivatives.

4. The composition as claimed in claim 1, wherein the organic acid is selected from the group consisting of ethanoic acid, propionic acid and hydroxy propionic acid.

5. The composition as claimed in claim 1, wherein the non-ionic surfactant is selected from the group consisting of poly ethylene glycol and poly propylene glycol.

6. A process for preparation of the dispersing agent composition as claimed in claim 1, wherein the steps comprise mixing:
   - [i] 60-80 wt % of a polyalkylene polyhydric compound having carbon chain length in the range of C3 to C15 with high solubility in water, with transparent to translucent appearance;
   - [ii] 5-25 wt % of an organic acid; and
   - [iii] 5-15 wt % of a non-ionic surfactant;

for a period of 30 minutes to 2 hours to obtain the desired dispersing agent.

7. A tanning process for treatment of a delimed pelt comprising applying to said delimed pelt a mixture of the dispersing agent composition according to claim 1 and a tanning agent mixed in the ratio of 1:5 to 3:4 for a period of 3 to 10 hours to obtain the tanned hide/skin.

* * * * *